United States Patent [19]

Ware et al.

[11] 4,089,499
[45] May 16, 1978

[54] SEATS

[75] Inventors: Peter George Ware, Rugby; Harold William White, Coventry, both of England

[73] Assignee: Dunlop Limited, London, England

[21] Appl. No.: 525,096

[22] Filed: Nov. 19, 1974

Related U.S. Application Data

[63] Continuation of Ser. No. 331,118, Feb. 9, 1973, abandoned.

[30] Foreign Application Priority Data

| Feb. 18, 1972 | United Kingdom | 7547/72 |
| Aug. 12, 1972 | United Kingdom | 37732/72 |
| Dec. 1, 1972 | United Kingdom | 55492/72 |
| Dec. 1, 1972 | United Kingdom | 55493/72 |

[51] Int. Cl.² .................................. F16M 13/00
[52] U.S. Cl. .................................. 248/376; 92/34; 188/129; 267/117; 248/400; 297/308
[58] Field of Search .............. 248/399, 400, 358 R, 248/372, 376, 377, 404; 308/6 R; 297/307, 308, 216; 188/1 B, 129; 267/9 C, 117, 120, 122, 123; 92/34, 39, 92

[56] References Cited

U.S. PATENT DOCUMENTS

| 1,424,783 | 8/1922 | Snaman | 267/9 C |
| 3,168,278 | 2/1965 | Ogden | 267/117 X |
| 3,326,603 | 6/1967 | Lehner | 297/308 |
| 3,446,527 | 5/1969 | Persson | 297/308 X |
| 3,480,324 | 11/1969 | Bauer et al. | 297/308 |
| 3,495,502 | 2/1970 | Bousso | 92/34 X |
| 3,532,379 | 10/1970 | Reilly et al. | 297/307 X |
| 3,558,094 | 1/1971 | Radke et al. | 248/400 X |
| 3,669,400 | 6/1972 | Lowe | 248/400 |
| 3,705,745 | 12/1972 | Ambrosius | 297/308 |
| 3,804,364 | 4/1974 | DeLepeleire | 92/34 X |

FOREIGN PATENT DOCUMENTS

| 803,454 | 2/1951 | Germany | 188/129 |

Primary Examiner—Roy D. Frazier
Assistant Examiner—Robert W. Gibson, Jr.
Attorney, Agent, or Firm—Stevens, Davis, Miller & Mosher

[57] ABSTRACT

A seat assembly in which a seat is mounted on a vibration damping mounting including a variable rate spring in the form of a fluid filled and pressurized pouch disposed between two rigid members capable of relative rotation, vertical movements of the seat which result in relative rotation of the two rigid members towards each other being arranged to compress the pouch and increase the area of contact of the pouch with the rigid members.

2 Claims, 16 Drawing Figures

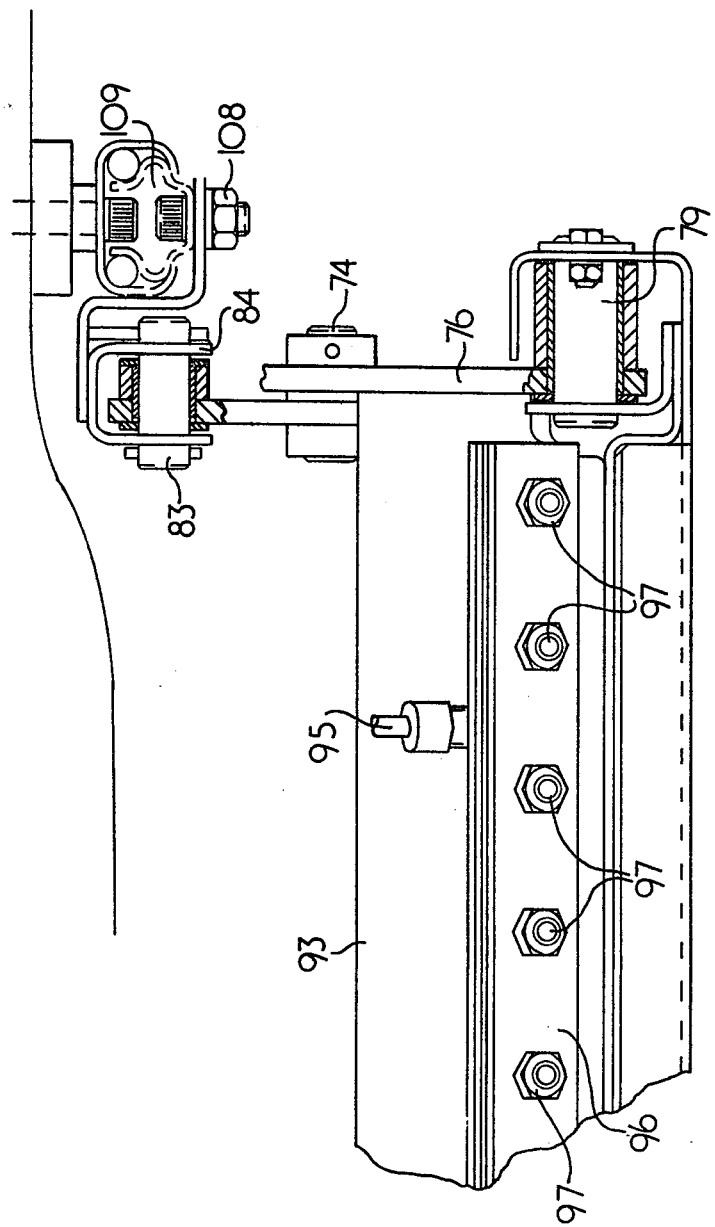

SEATS

This is a continuation of application Ser. No. 331,118, filed Feb. 9, 1973, now abandoned.

This invention relates to seat assemblies incorporating a vibration damping mounting and particularly, though not exclusively, to such seat assemblies for use on tractors and heavy commercial vehicles.

There is a growing tendency for tractor and commercial vehicle manufacturers to replace the crude unsprung traditional seats used on these vehicles with a sprung seat which provides much improved confort and safety for the driver. This tendency has been reinforced by legislation in certain countries laying down performance requirements with which the seats fitted to tractors currently sold in these countries must comply.

It is an object of the present invention to provide an improved seat assembly incorporating a vibration damping mounting.

According to the present invention a seat assembly comprises a seat provided with a vibration damping mounting comprising two rigid members capable of relative rotation, one member being operatively connected with the seat and the other member with the component on which the seat assembly is to be mounted, and a pouch arranged to be filled with fluid under pressure and disposed between the two members so that vertical movement of the seat resulting in relative rotation of the two members towards each other compresses the pouch and increases the area of contact of the pouch with the two members.

Several embodiments of the present invention, as applied to a tractor seat, will now be described by way of example with reference to FIGS. 1 to 15 of the accompanying drawings in which:

FIG. 3 is a sectional view on the line B—B of FIG. 1;

FIG. 15 is a part-sectional view showing sectional details on the lines K—K of FIG. 13.

Figure 1:
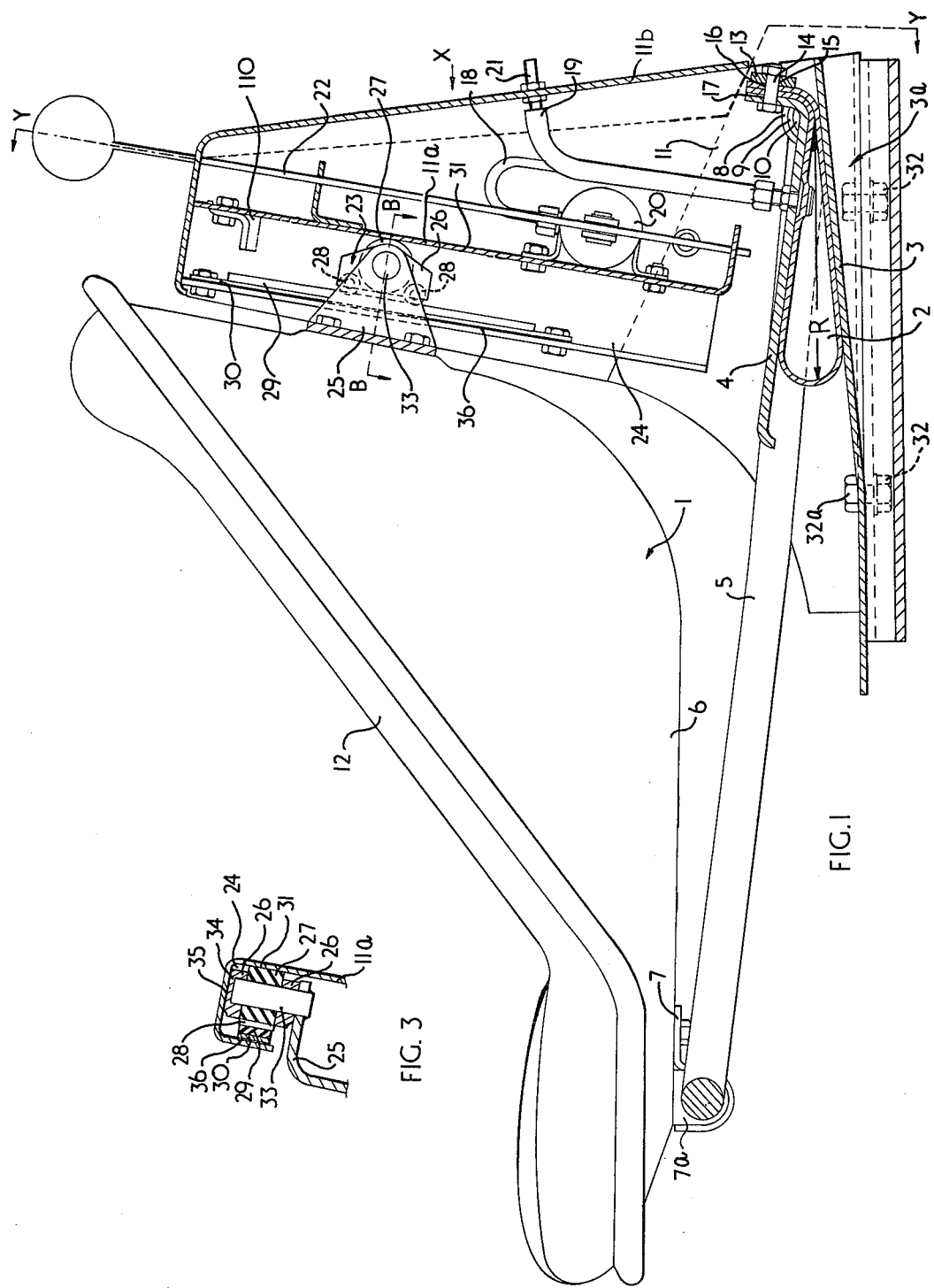
FIG. 1 is a sectional view on the line A—A of FIG. 2 of a tractor seat assembly in accordance with the present invention.
Figure 2:
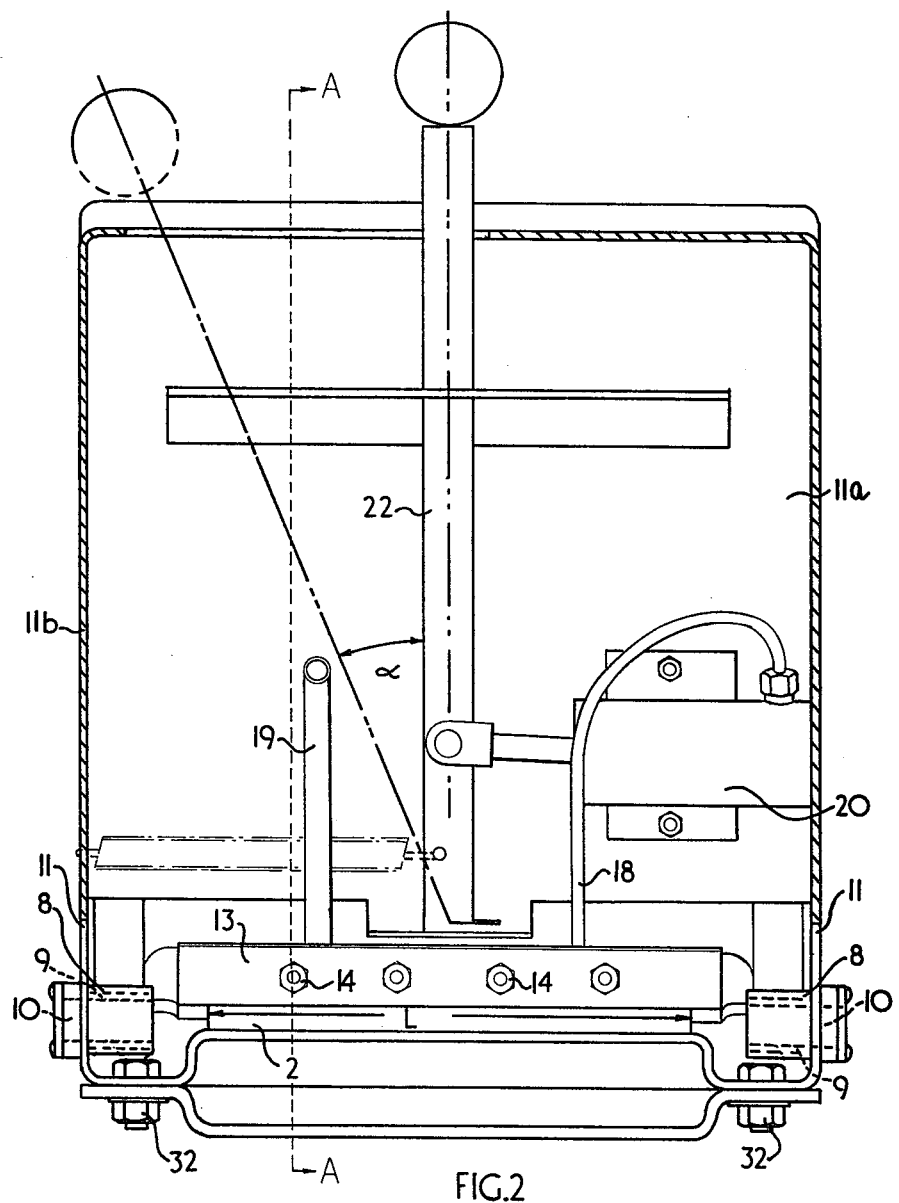
FIG. 2 is an end view in the direction X of FIG. 1 with part of a detachable cowl fitted to the back of the seat assembly removed on the line Y—Y of FIG. 1.

A tractor seat assembly, as shown in FIGS. 1 to 3, comprises a seat 1 which is arranged to be mounted on the tractor by a vibration damping mounting comprising a fluid-filled pouch 2 disposed between a steel plate 3, forming the upper part of a mounting bracket 3a secured to the tractor, and a further plate 4 associated with the seat.

The assembly arrangement is such that when the seat is displaced vertically the plate 4 associated with the seat pivots relative to the plate 3 associated with the tractor thus varying the area of contact between the plates and the pouch so that the pouch functions as a variable rate spring.

The seat itself comprises a pressed steel pan 6 upholstered in foam and provided with a P.V.C. cover 12. The plate 4 associated with the seat extends between and is secured to two arms of a U-shaped bar 5, which normally extends at a relatively small angle to the horizontal. The base portion of the U-shaped bar extends transversely under the front of the seat and is pivotally secured beneath the seat pan 6 by two brackets 7 incorporating bushes 7a and positioned one at each side of the seat. The two ends of the arms of the U-shaped bar 5 are each provided with a bearing support ring 8 which houses a sleeve bearing 9. A pair of aligned pivot pins 10 are carried one on each side of the lower part 11 of a seat support frame, which is either formed integrally with or secured to the plate 3. The pivot pins 10 are received in the sleeve bearings 9 so that vertical movement of the seat commences by the rotation of the seat about the base portion of bar 5 and results in the rotation of bar 5, and hence plate 4, relative to plate 3 about the longitudinal axis of the pivot pins 10.

If desired, in place of the U-shaped bracket described above, the seat can be mounted on two separate pivotted levers (not shown) rigidly interconnected by the plate 4. Each of the levers may, for example, be pivotally secured at one end to the underside of the front of the seat and arranged to extend rearwardly and downwardly towards the lower part 11 of the seat support frame to which it is also pivotally secured.

The pouch 2, which is substantially slab-shaped when not pressurized, is made from textile reinforced rubber material and secured in position on plate 4 by a clamping strip 13 and a series of nut and bolt assemblies 14 which extend through corresponding series of apertures 15, 16 and 17 provided in the clamping strip, pouch and plate 3 in order to clamp the pouch between the clamping strip and the plate 4. The pouch can alternatively be constructed from unreinforced elastoplastic material.

It is important that the pouch is secured in such a position, relative to the longitudinal axis of pivot pins 10, that when pressurized it assumes a substantially wedge-shaped cross-section configuration which cooperates with the plates 3 and 4 so that the area of contact of the pouch with the plates varies with the included angle between the plates as described above. The pouch 2 and plates 3 and 4 thus function as a spring of the kind disclosed in British Patent Specification No. 1,193,264.

By securing the inner edge of the wedge-shaped pouch at or closely adjacent the axis about which the relative rotation of plates 3 and 4 occurs, the possibility of relative movement between the pouch and these plates during operation of the seat assembly is greatly reduced. This greatly increases the operating life of the pouch.

The pouch is provided with an inlet pipe 18 through which air may be supplied from a hand pump 20 incorporating a non-return valve and carried on the upper part 11a of the seat support frame. The pump is operated by the movement of a spring-loaded pumping lever 22 through an arc α, as shown in FIG. 2.

In addition to inlet pipe 18, the pouch is also provided with an outlet pipe 19 which is connected to a pressure release valve 21 which enables the air pressure within the pouch to be lowered by exhausting to atmosphere if desired.

As an alternative to the separate inlet and outlet pipes described above supplied with air from a pump mounted on the seat, the pouch can be supplied with air from a separate detachable pump (not shown), such as for example a tire foot pump, or from a static air supply line. The inlet and outlet pipes can also be combined into a single pipe (not shown) incorporating a combined non-return and exhaust valve. If the seat assembly is used on a commercial vehicle fitted with an air supply line the pouch could be connected to the air supply line via a single pipe incorporating a three-position valve capable of either isolating the pouch from the supply line, connecting the pouch to the supply line, or exhausting the pouch.

The various means, described above, for varying the internal pressure within the pouch allow the performance characteristics of the seat assembly to be adjusted.

As described above vertical movement of the seat results in the rotation of bar 5, and hence plate 4, relative to plate 3. The vertical movement of the seat is damped and guided by two systems of rollers 27, 28 positioned one on each side of the back of the seat pan and arranged to project into and engage locating channels 24 of substantially U-shaped cross-section formed one at each side of the upper part 11a of the seat support frame. These locating channels, which are disposed substantially vertically, and are an integral part of the upper part 11a of the support frame, are disposed so that their open sides face each other, see FIG. 3.

Each system of rollers is supported on the back of the seat pan by a bracket 25 and comprises a main larger diameter load-taking roller 27 and two smaller diameter damping rollers 28 all carried by a two-piece block 23. The two halves 26 of each block 23 are held together by a pin 33 on which the larger diameter roller is mounted and which is secured to the mounting bracket 25. The outer half of each two-piece block 23 is provided with a side pad or projecting boss 34, arranged to make sliding contact with the base 35 of each guidance channel. Thus the bosses on the two blocks 23 together provide lateral control of the vertical movement of the seat.

Each load-taking roller 27 is arranged to directly contact the rear load-taking side 31 of each guidance channel and the damping rollers are pre-loaded into contact with a strip 29 of rubber which is bonded to a backing plate 30. The backing plate is in turn bolted to the non-load-taking side of each channel.

Vertical movement of the seat therefore results in the movement of the rollers up or down their associated guidance channels. This movement of the rollers results in the continuous compressing and releasing of the rubber strip 29 as rollers 28 pass up or down the channels thus damping the movements of the seat as a result of the internal hysteresis losses within the rubber strips 29. The damping effect can be increased by inserting metal shims 36 between the backing plate 30 and the support frame 11 in order to increase the contact pressure between the damping rollers 28 and the rubber strips 29.

The upward movement of the seat is limited by two rebound stops 110 positioned one at the top of each guidance channel for contact with the load-taking rollers 27, while downward movement of the seat is limited by the head 32a of one of the bolts 32 on each side of the seat which secure the parts of the mounting bracket 3a together. The bolt heads 32a contact the arms of the U-shaped bracket 5 when the pouch is deflected to prevent damage to the pouch. If desired a rubber stop (not shown) can be used in place of the contact between the bolt heads 32a and the arms of the U-shaped bar 5.

Downward movement of the seat causes the plate 4 to rotate towards the plate 3. This movement is resisted by the pouch 2 which is situated between these two plates and acts as a pneumatic spring. As plate 4 rotates towards plate 3, the area of contact between the pouch 2 and the plates 3 and 4 increases as does the internal pressure within the pouch. Thus the force exerted on the plates 3 and 4 opposing the movement of these plates towards each other increases as the plates come closer together. The pouch thus functions as a variable rate spring.

By virtue of its substantially wedge-shaped cross-section when pressurized, the actual rate of change of the area of contact between the pouch and plates 3 and 4 per unit angle increases as the plates come closer together, as the pouch then assumes a more slab-shaped cross-section. This increases in the rate of change per unit angle of the area of contact between the pouch and plates 3 and 4 results in a corresponding increase in the rate of change per unit angle of the spring rate of the pouch as the plates 3 and 4 come closer together. This in turn increases the natural frequency of oscillation of the seat when the seat operates about a mean position involving close proximity of these plates.

In order to reduce the natural frequency of oscillation of the seat, it is therefore desirable to avoid operation of the seat about a mean position involving the close proximity of these plates. This is achieved by arranging the length of the arms of the U-shaped bar 5 to be such that the moment of the tractor driver's weight about the longitudinal axis of pivot pins 10 is such that the internal pressure required within a particular pouch to support the driver's weight in a static situation results in an included angle of the order of 15°–25°. This will ensure that, except in the case of a violent displacement of the seat caused by the tractor going over a large surface irregularity, the plates 3 and 4 are sufficiently far apart to ensure that the natural frequency of oscillation of the seat is within the required range.

The aspect ratio of the pouch, that is the ratio of the dimension L of the pouch along the longitudinal axis of pivot pins 10 to the dimension R of the pouch in the direction at right angles to the axis of pins 10, is also an important factor in determining the rate of change per unit angle of the contact area between the plates 3 and 4 and pouch 2. High aspect ratio pouches, that is those whose dimension L is appreciably greater than their dimension R have a lower rate of change of contact area per unit angle than low aspect ratio pouches. Thus for a given seat assembly the selection of a high aspect ratio pouch lessens the rate of increase of the contact area between the pouch and plates as the plates come closer together, so that the force which the spring exerts on the plates 3 and 4 to oppose the movement of these plates towards each other increases at a lower rate resulting in a lower natural frequency for the seat assembly.

The seat assembly is provided with a mean position indicator (not shown) which indicates when the seat is midway between its lowest and highest possible displaced positions. This enables the tractor driver to ensure that the seat rests in the mean position, when carrying the driver as a static load, by adjusting the air pressure in the pouch. This ability to adjust the static position of the seat to correspond with the mean position is important if the seat assembly is to perform satisfactorily with a wide weight range of drivers.

If desired, an extra volume tank (not shown) can be connected to the pouch to increase the effective volume of the pouch thus lowering the increase in internal pressure within the pouch for a given angular movement of plates 3 and 4 towards each other. This reduces the change in spring rate per unit angle and lowers the natural frequency of oscillation of the spring, allowing the operation of the seat assembly about mean oscillation positions involving the closer proximity of the plates 3 and 4.

When an extra volume tank is used the movement of the air from the pouch to the extra volume tank and vice versa can be used to provide a measure of internal damping by positioning a suitable flow restrictor or orifice between the pouch and extra volume tank.

As an alternative, the internal damping can be further increased, thereby rendering the use of a separate damping means unnecessary, by employing a more viscous operating medium in the pouch in place of air. For example, a liquid such as oil can be employed and the pouch containing the liquid connected via a suitable flow restrictor or restrictors to a liquid containing chamber in a hydropneumatic accumulator of the kind employed in vehicle suspension systems. Such accumulators basically comprise a liquid containing chamber and a pressurized gas containing chamber separated by a flexible diaphragm. Compression of the pouch thus results in the displacement of liquid from the pouch into the liquid-containing chamber of the accumulator via the flow restrictor or restrictors thus damping the movement of the seat. This influx of liquid into the accumulator in turn results in the displacement of the diaphragm so compressing the gas contained within the accumulator and providing the necessary spring action.

When employing a hydro-pneumatic arrangement as described above air may conveniently be used as the spring medium and a hand pump, pressure release valve and optionally an extra volume tank may be connected to the accumulator chamber containing the air so that the performance characteristics and mean static position of the seat arrangement can be adjusted as required. Alternatively liquid can be transferred from a reservoir to the pouch in order to adjust the mean static position and performance characteristics of the seat assembly.

A detachable cowl 11b made from plastics material is secured to the seat support frame to protect the hand pump, damping rollers and guidance channels and any other ancillary components, such as an extra volume tank or accumulator, which may be fitted to the seat assembly.

The damping and guidance system described above which operates on the principle of compressing and releasing high hysteresis rubber using rollers can be modified to take many forms. Some examples of alternative forms of damping and guidance systems suitable for use with a seat assembly in accordance with the present invention are shown in FIGS. 4 to 12B of the accompanying drawings.

Figure 4:
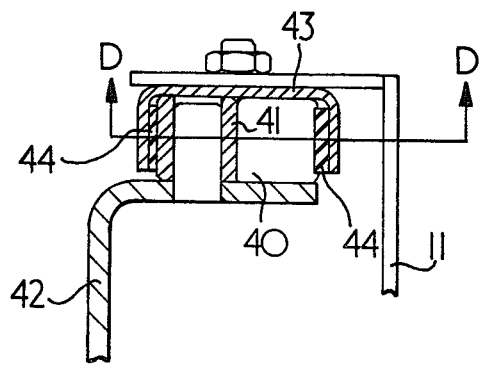
FIG. 4 is a sectional view on the line C—C of FIG. 5 of an alternative form of damping and guidance system suitable for use in the seat assembly shown in FIG. 1.
Figure 5:
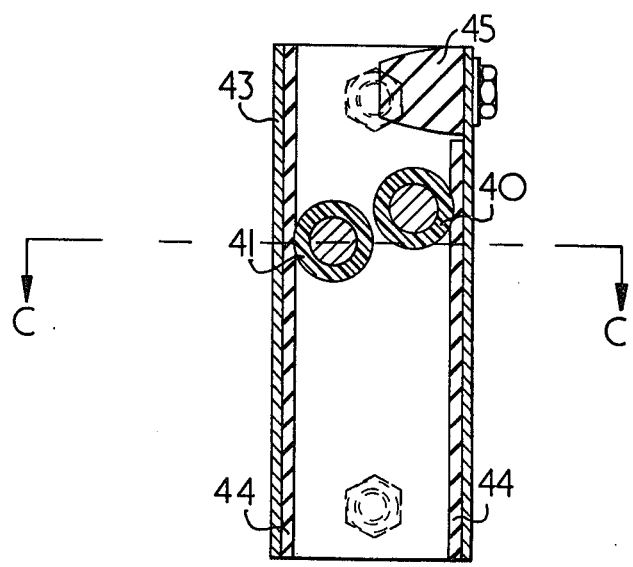
FIG. 5 is a sectional view on the line D—D of FIG. 4.

In the damping and guidance system shown in FIGS. 4 and 5 two pairs of rotatable nylon rollers 40, 41 are secured to the back of the seat pan by brackets 42 positioned one on each side of the seat. Each pair of rollers projects into and engages a guidance channel 43 of substantially U-shaped cross-section provided on the support frame 11.

The sides of each guidance channel are lined with strips 44 of rubber and the rollers are pre-loaded into contact with the rubber lining so that vertical movements of the seat, which result in the movement of each pair of rollers along their associated channel, are damped by the internal hysteresis losses with the lining material. Upward movement of the roller in each channel is limited by a rubber rebound stop 45 bolted to the wall of the channel.

In the damping and guidance system shown in FIGS. 4 and 5 roller 40 is arranged to be the rear roller of each pair and is the main load carrier. The contact pressure of this roller therefore varies depending on the weight of the tractor driver and the position of the seat, whereas the contact pressure of roller 41 fluctuates through a smaller range. If desired, in order to obtain more uniform damping, the rubber lining can be omitted on the side of each channel contacted by the load-carrying roller 40, and roller 40 can be arranged to directly contact the channel. With this arrangement the damping effect of rollers 40, which is prone to greater fluctuations than that of roller 41, is eliminated and thus more uniform overall damping is achieved.

Figure 6:
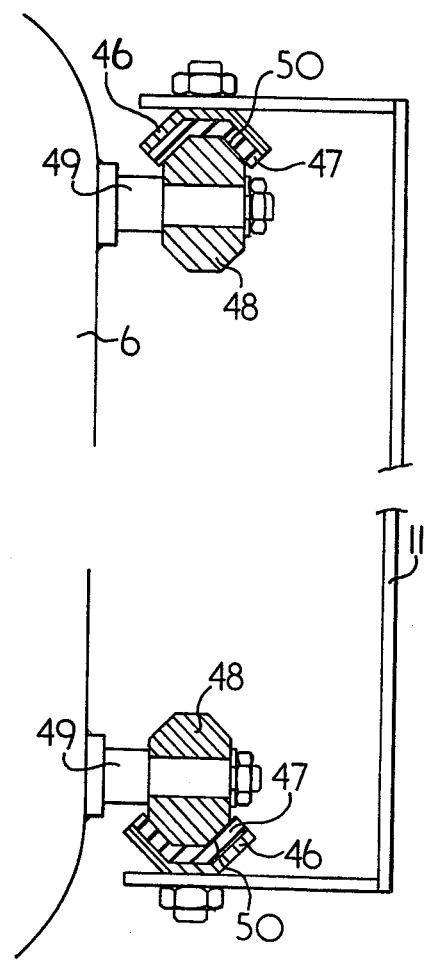
FIG. 6 is a sectional view on a horizontal plane of a further alternative form of damping and guidance system.

FIG. 6 shows a further form of damping and guidance system in which the sides of the guidance channels 46 are inclined outwardly and the entire channel is lined with a high hysteresis rubber mix 47.

The seat is provided with two rotatable nylon rollers 48, one at each side, which are mounted on shafts 49 which are welded or otherwise secured to the rear of the seat. The cross-section of each roller is arranged to correspond with the cross-section of the associated guidance channel so that relative movement between the rollers and the channels is again damped by internal hysteresis.

As with the arrangement shown in FIGS. 4 and 5, the arrangement shown in FIG. 6 can be modified, if desired, so that the load-carrying faces 50 of the rollers can be arranged to directly contact the channel thereby reducing the previously discussed variations in damping produced by variations in roller contact pressure.

Figure 7:
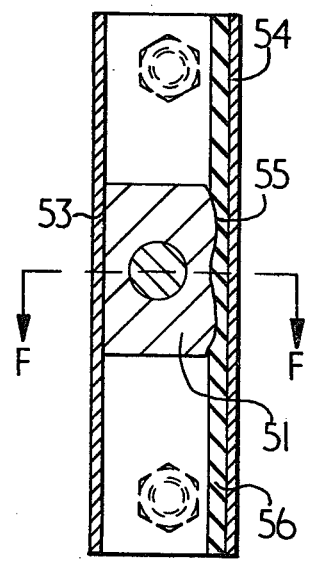
FIG. 7 is a sectional view on the line E—E of FIG. 8 of a still further alternative form of damping and guidance system.
Figure 8:
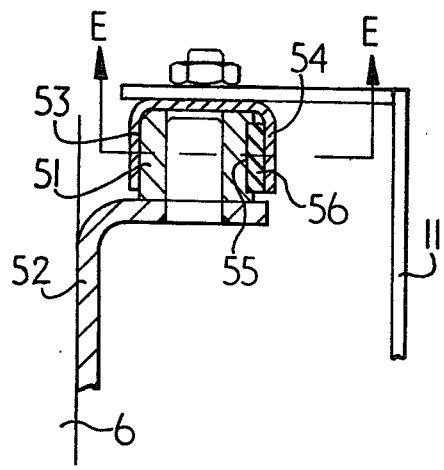
FIG. 8 is a sectional view on the line F—F of FIG. 7.

In a still further form of damping and guidance system shown in FIGS. 7 and 8 the rollers employed in the previously described constructions are replaced by a pair of pivoted nylon blocks 51 secured one on each side of the rear of the seat by brackets 52. The load-carrying face 53 of each block is flat and is arranged to directly contact one side of its associated guidance channel 54, while the other face 55 of each block is wave-shaped in form and is preloaded into contact with a strip 56 of rubber bonded to the non-load-carrying side of the associated channel. The arrangement shown in FIGS. 7 and 8 thus eliminates variations in damping due to variations in contact pressure by arranging that only the non-load-carrying faces of the blocks engage the rubber liner.

The wave-shaped form of the faces of the blocks which contact the rubber liners assists in promoting ripples in the surface of the liners as the blocks slide up and down the guidance channels. This promotion of surface ripples is a feature of all the rubber damping and guidance systems described in this specification and it is as a result of continuously compressing and releasing the rubber liners by the passage of the rollers or blocks up and down the guidance channels that the damping effect is achieved. The damping effect results because, as a result of the internal hysteresis loss within the liners, the restoring force exerted on the rollers or blocks as a result of a given deflection of the liners is smaller than the force which the rollers or blocks must exert on the liners in order to achieve that deflection.

Figure 9:
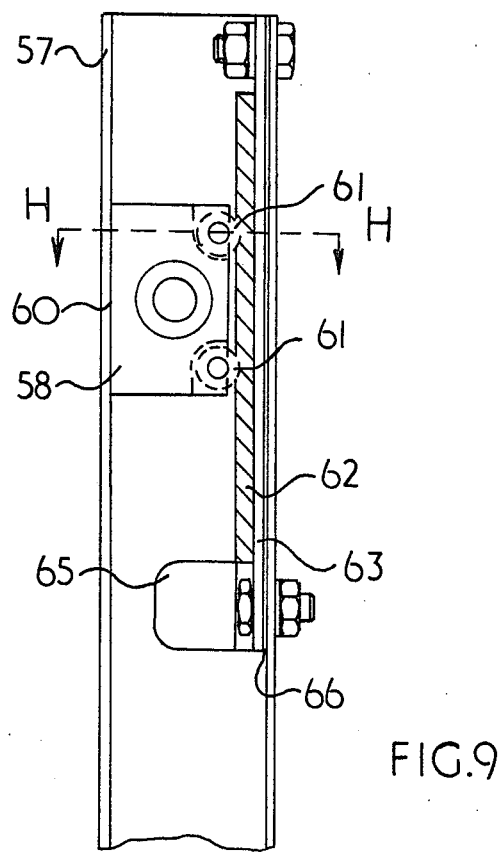
FIG. 9 is a side view in the direction G of FIG. 10 of a still further alternative form of damping and guidance system.
Figure 10:
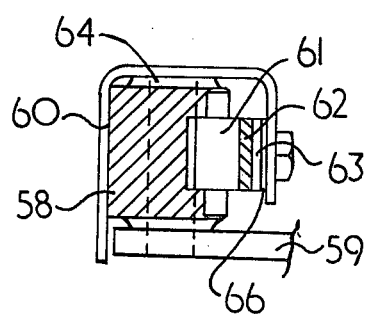
FIG. 10 is a schematic side view of a damping and guidance system similar to that shown in FIGS. 4 and 5 in which the damping characteristics are arranged to vary with deflection.
Figure 11:
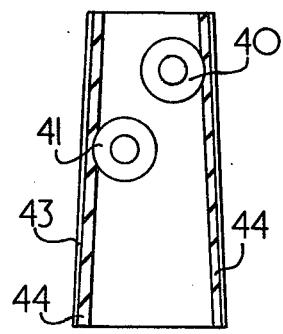
FIG. 11 is a schematic side view of another form of damping and guidance system in which the damping characteristics are arranged to vary with deflection.
Figure 12A:
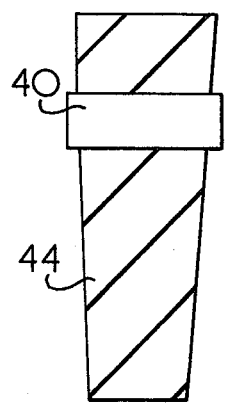
FIGS. 12A and 12B are schematic front and side views respectively of another form of damping and guidance system in which the damping characteristics are arranged to vary with deflection.
Figure 12B:
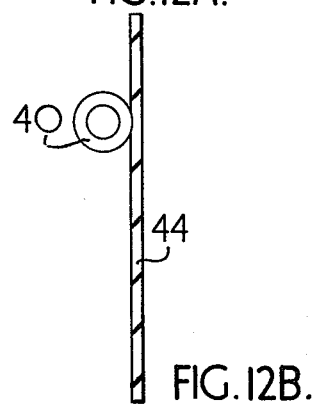

A still further form of suitable damping and guidance system, shown in FIGS. 9 and 10, comprises two guidance channels 57 disposed one on each side of the seat and secured to support frame 11. A pair of pivotted nylon blocks 58 are secured one on each side of the seat by attachment brackets 59, one block being arranged to project into and engage each guidance channel.

The rear load-carrying face 60 of each block is flat and is arranged to directly contact one side of the associated guidance channel. The front face of each block carries two rollers 61 which engage a strip 62 of rubber bonded to a backing plate 63 which is secured to the adjacent non-load-carrying side of the guidance channel.

Each block is also provided with a side pad or projecting boss 64 which is arranged to make sliding contact with the base of each guidance channel. Thus the side pads of the two blocks together provide lateral control of the vertical movement of the associated seat.

A rubber stop 65 may be provided at either end of each rubber liner in order to limit the movement of the associated block within the guidance channel.

The damping effect can be varied, as described above with reference to the construction in FIGS. 1 to 3, by adding shims 66 between the backing plate 63 and channel 57, thus increasing the contact pressure between the rollers and the liner.

Other forms of the damping and guidance systems described above will occur to those skilled in the art. For example, the damping and guidance system shown in FIGS. 4 and 5 can be modified by providing only the non-load-taking side of each guidance channel with a lining of rubber and arranging the load-carrying roller of each pair, which directly engages the guidance channel, to be considerably larger in size than the non-load-carrying roller. This arrangement reduces the loading on the load-carrying rollers as a result of their increased diameter and, as experience has shown that the non-load-carrying rollers achieve a lower level of damping for displacements of less than half their diameters, the damping of lower amplitude oscillations of the seat is improved by decreasing the size of the non-load-carrying rollers.

Alternatively, if a cheaper but less efficient damping and guidance system is required, the two rollers shown in FIGS. 4 and 5 can be replaced by a single larger diameter roller the load-taking side of which makes rolling contact with a rubber liner secured to the load-taking side of the guidance channel and the other side of which skids along the other side of the guidance channel.

The damping characteristics of the systems described above can be varied by adjusting the mix of the rubber from which the liners are produced in order to vary the internal hysteresis losses, and by adjusting the pre-loading and/or contact pressure between the rollers or blocks and the rubber liners or strips. For example, the damping characteristics of the systems can be arranged to vary with deflection by tapering the cross-section of the channels to increase or decrease the contact pressure, as shown schematically in FIG. 11, or by varying the area of contact between the rollers and rubber by varying the dimensions of the rubber, as shown schematically in FIGS. 12A and 12B.

Although in all the constructions described above the strip or lining material has been stated as being rubber, any elastomeric material possessing the necessary level of hysteresis is suitable.

As an alternative to the various rubber damping and guidance systems described above other forms of damping, such as a conventional hydraulic damper, could be used and the roller systems can then be simplified to a single roller attached to each side of the rear of the seat pan which runs in a substantially vertically disposed U-shaped channel purely to guide the movement of the seat.

Figure 13:
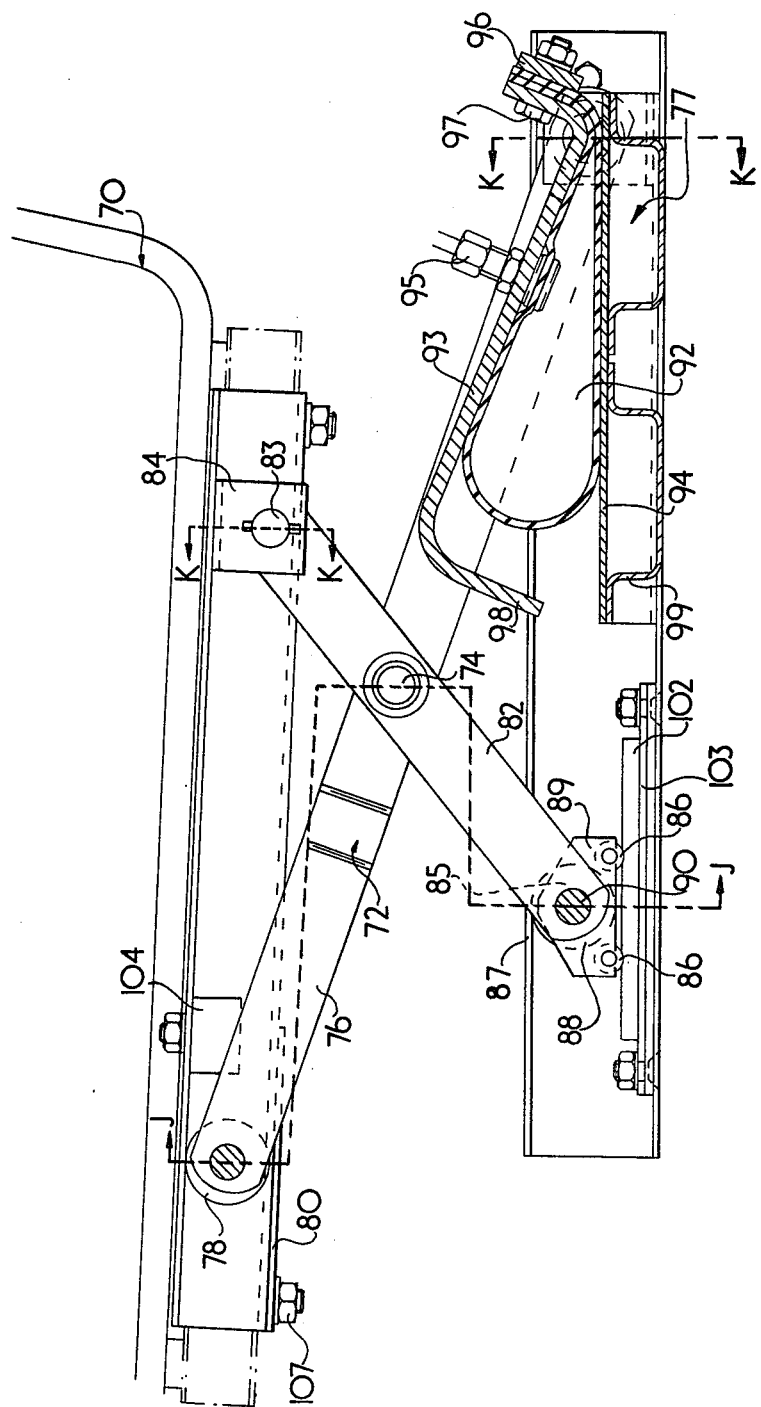
FIG. 13 is a longitudinal section through a further form of seat assembly in accordance with the present invention.
Figure 14:
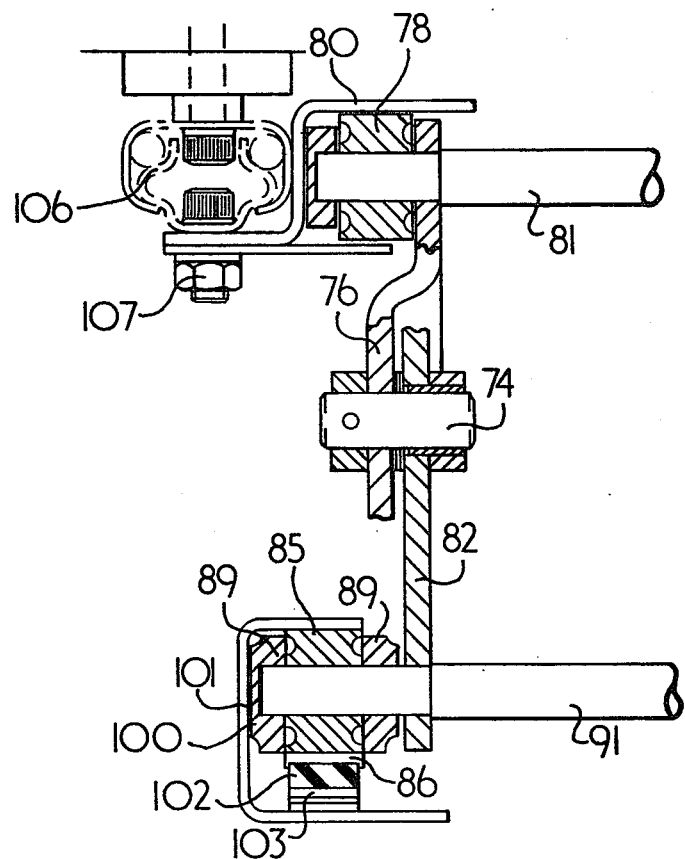
FIG. 14 is a sectional view on the line J—J of FIG. 13.

FIGS. 13 to 15 of the accompanying drawings show a further form of seat assembly in accordance with the present invention in which a tractor seat 70 is mounted on two pairs of scissor levers 72 disposed one on each side of the seat. The levers of each pair are of unequal length and are interconnected by pivot pins 74.

The longer lever 76 of each pair is connected at one end by a pin 79 to a frame 77 which is secured to the tractor. The other end of each lever 76 is connected to a roller 78 which is located within one of two substantially horizontal upper guidance channels 80 positioned one on each side of the seat. The guidance channels are secured to the underside of the seat by bolts 107 which also extend through horizontal adjustment devices 106. The two rollers 78 are rotatably mounted on a tie-rod 81 which extends through the levers 76.

The other lever 82 of each pair is connected at one end by a pin 83 to a bracket 84 secured to the underside of the seat by a bolt 108 which also extends through a horizontal adjustment device 109. The other end of each lever 82 is connected to a system of rollers 85, 86 similar to that used in the seat assembly shown in FIGS. 1 to 3 which engages one of two substantially horizontal lower guidance channels 87 which form part of frame 77 and which extend one at each side of the seat.

Each roller system comprises a larger diameter load-taking roller 85 and two smaller diameter damping rollers 86 all carried in a two-piece block 88. The two halves 89 of each block 88 are held together by a tie-rod 91 which extends between the block and on which the load-taking rollers are mounted.

The outer half of each block 88 is again provided with a boss 100 which is arranged to make sliding contact with the base 101 of each guidance channel so that the two blocks 88 together provide lateral control of the vertical movement of the seat.

Each load-taking roller 85 directly contacts the guidance channel and the damping rollers 86 are pre-loaded into contact with a strip 102 of rubber which is bonded to a backing plate 103. The backing plate is in turn bolted to the non-load-taking side of each channel.

The seat is again supported on a variable rate spring in the form of a textile reinforced pouch 92 which is arranged to act between a plate 93 secured to longer levers 76 and a plate 94 forming part of frame 77. The pouch, which is provided with a single pipe 95 for admitting air to and exhausting air from its interior, is clamped between a clamping plate 96 and plate 93 by a series of nuts and bolts 97.

The edge 98 of plate 93 remote from pivot pins 79 is bent downwardly, considering the seat arrangement as shown in the accompanying drawings, in order to provide some degree of protection for the pouch and to limit the downward movement of the seat. The plate 94 to which the pouch is clamped is reinforced by a number of sheet metal channel sections 99.

Vertical movement of the seat, which results in the horizontal displacement of blocks 88, is damped as a result of the internal hysteresis losses within the rubber strips caused by the continuous compressing and releasing of the rubber liners by the damping rollers 86 carried by each block. A rubber stop 104 is provided in the upper guidance channels 80 to limit the vertically upward movement of the seat.

By arranging the levers 82 to be shorter than levers 76 and to operate at a greater angle to the horizontal than levers 76, the angular movement of levers 82 resulting from a given vertical displacement of the seat is increased. This in turn increases the movement of the blocks 88 within the lower guidance channels thus increasing the damping force applied to the seat for a given vertical displacement.

The internal pressure within the pouch can be increased either by the use of a separate pump or air-line as described in connection with FIGS. 1 to 3. Alternatively any of the other inlet and outlet pipe arrangements previously used in connection with FIGS. 1 to 3 can be employed. This ability to increase or decrease the internal pressure within the pouch enables the performance characteristics of the pouch spring to be adjusted as previously described with reference to the seat assembly shown in FIGS. 1 to 3.

The extra volume tank feature described above in connection with the seat assembly shown in FIGS. 1 to 3 can also be employed in the assembly shown in FIGS. 13 to 15, as can the orifice damping and hydropneumatic accumulator arrangements.

The seat assemblies described above, by the incorporation of a fluid-filled pouch disposed between two rigid members which rotate relative to each other in response to vertical movements of the seat, provide a relatively cheap and efficient solution to the problem of mounting a seat on a vibration damping mounting incorporating a variable rate spring.

Having now described our invention what we claim is:

1. A seat assembly comprising a seat provided with a vibration damping mounting including two rigid relatively rotatable members disposed below the level of the seat, one member being operatively associated with the seat and the other member being operatively associated with a component on which the seat assembly is mounted and a pouch filled with fluid under pressure and formed as a single wedge shaped chamber disposed between the two members so that vertical movement of the seat results in relative rotation of the two members towards each other and compresses the pouch and increases the area of contact of the pouch with the two members, the member associated with the seat being connected to the seat at a position further from the axis of rotation of said member than the position of the pouch so that vertical displacement of the seat is greater than the vertical displacement of the portion of the pouch in engagement with said member associated with the seat; a damper for controlling vertical movement of the seat, said damper comprising a body of deformable elastomeric material and a component preloaded into contact with the body of elastomeric material, said damper comprising two basic parts, a guidance channel of substantially U-shaped cross-section only one side of which is lined with a deformable elastomeric material an other side not so lined for supporting the main load transmitted through said damper as a result of any weight applied on the seat, and a locating means arranged to project into the channel in pre-loaded contact with the elastomeric material, one of the two parts of the damper being arranged to be operatively associated with the seat and the other with a portion of the mounting arranged to be fixed relative to the component on which the seat assembly is to be mounted, the damping arrangement being such that vertical movement of the seat results in the displacement of the locating member along the channel, this displacement, and hence the vertical movement of the seat, being resisted and damped by the internal hysteresis of the elastomeric material.

2. A seat assembly according to claim 1 in which the damper locating means comprises a block provided on one face with two rollers pre-loaded into rolling contact with the lining of elastomeric material, secured to one side of the associated damper guidance channel, another face of the block carrying a third roller arranged to make direct rolling contact with the other side of the associated guidance channel.

* * * * *